(12) United States Patent
Qu et al.

(10) Patent No.: US 8,091,691 B2
(45) Date of Patent: Jan. 10, 2012

(54) DISK BRAKE

(75) Inventors: Yesheng Qu, Changshu (CN); Jianwen Cao, Changshu (CN); Wenna Fang, Changshu (CN); He Zhang, Changshu (CN); Wei Zhou, Changshu (CN)

(73) Assignee: Suzhou Torin Drive Equipment Co., Ltd., Jiangsu (CN)

( * ) Notice: Subject to any disclaimer, the term of this patent is extended or adjusted under 35 U.S.C. 154(b) by 782 days.

(21) Appl. No.: 12/233,796

(22) Filed: Sep. 19, 2008

(65) Prior Publication Data

US 2009/0260927 A1 Oct. 22, 2009

(30) Foreign Application Priority Data

Apr. 16, 2008 (CN) .......................... 2008 1 0023975

(51) Int. Cl.
*B60T 13/04* (2006.01)
*H02K 7/10* (2006.01)

(52) U.S. Cl. ....... 188/171; 188/161; 188/173; 188/71.7; 188/196 M; 310/77

(58) Field of Classification Search ................. 188/161, 188/171, 173, 71.7, 196 M; 310/76, 77, 93
See application file for complete search history.

(56) References Cited

U.S. PATENT DOCUMENTS

| 1,449,120 | A | * | 3/1923 | Lemery | 188/79.61 |
| 2,057,749 | A | * | 10/1936 | Tatter | 188/79.51 |
| 4,142,610 | A | * | 3/1979 | Alexander et al. | 188/71.9 |
| 4,156,478 | A | * | 5/1979 | Kroeger | 188/171 |
| 4,966,255 | A | * | 10/1990 | Fossum | 188/71.8 |
| 5,685,398 | A | * | 11/1997 | Marshall et al. | 188/171 |
| 6,536,563 | B1 | * | 3/2003 | Schlehbusch et al. | 188/161 |
| 2004/0045776 | A1 | * | 3/2004 | Baumgartner et al. | 188/71.7 |

FOREIGN PATENT DOCUMENTS

CN 1551955 A 12/2004

* cited by examiner

*Primary Examiner* — Bradley King
*Assistant Examiner* — Mahbubur Rashid
(74) *Attorney, Agent, or Firm* — Christie, Parker & Hale, LLP

(57) ABSTRACT

A disk brake for a traction machine having a damping height of a damping mechanism that can be adjusted integrally. According to one embodiment, a disk brake includes: a static iron core; a spring and a coil assembly in the static iron core; a dynamic iron core assembly including a dynamic iron core, a dynamic disk, and first and second friction rotors configured to fit with the dynamic iron core and the dynamic disk; a plurality of connecting bolts; a plurality of spacers; a damping mechanism on the dynamic iron core assembly, the damping mechanism including a plurality of damping components on the dynamic iron core; an adjusting toothed belt assembly coupled to the damping components and banded to a circumferential outer surface of the dynamic iron core; and an adjusting bracket on the dynamic iron core and coupled to the adjusting toothed belt assembly.

18 Claims, 7 Drawing Sheets

DISK BRAKE

CROSS-REFERENCE TO RELATED APPLICATION(S)

This application claims the priority to and the benefit of Chinese Patent Application Number 200810023975.0 CN, filed in the State Intellectual Property Office (SIPO) of China on Apr. 16, 2008, the entire content of which is incorporated herein by reference.

FIELD OF THE INVENTION

The present invention relates to a disk brake, and in particular to a disk brake for a traction machine, on which a damping height of a damping mechanism can be adjusted integrally.

BACKGROUND OF THE INVENTION

The structure and installation method of disk brakes commonly seen in the market are shown in FIG. 1. Such a disk brake mainly comprises a static iron core (1); a spring (3) and a coil assembly (2) in the static iron core (1); a dynamic iron core assembly including a dynamic iron core (8), a dynamic disk (8a), first and second friction rotors (4, 4a) designed to fit with the dynamic iron core (8) and the dynamic disk (8a) and mounted on a main shaft (9) of the traction machine; a set of connecting bolts (6) designed to mount the dynamic iron core assembly to an installation end face (10) of the traction machine; a set of spacers (7) arranged at certain spacing on the dynamic iron core assembly and designed to fit with the connecting bolts (6); and a damping mechanism arranged on the dynamic iron core assembly, wherein the damping mechanism comprises a set of cushion pads (5), which are evenly distributed on the dynamic iron core (8) of the dynamic iron core assembly between opposite surfaces of the dynamic and static iron cores (8, 1), and are designed to provide cushion and noise reduction functions when the dynamic iron core (8) of the dynamic iron core assembly impacts the surface of the static iron core (1). When the coil in the coil assembly (2) is not in charged state, the spring (3) presses the dynamic iron core (8), the dynamic iron core (8) and the dynamic disk (8a) hold the first friction rotor (4), and the dynamic disk (8a) and the installation end face (10) of the traction machine hold the second friction rotor (4a), to form friction force. The first and second friction rotors (4, 4a) are fitted to the main shaft (9) of the traction machine via a spline, respectively, and therefore deliver braking effect. When the coil in the coil assembly (2) is charged, a magnetic loop is formed between the static iron core (1), the dynamic iron core (8), and the air gap between the static iron core (1) and the dynamic iron core (8), and electromagnetic force is produced; the electromagnetic force overrides the spring force of the spring (3) and forces the static iron core (1) to pick up the dynamic iron core (8), and the air gap between the static iron core (1) and the dynamic iron core (8) transfer to the sides of the first and second friction rotors (4, 4a), so that the first and second friction rotors (4, 4a) rotate with the main shaft (9) of the traction machine. In the structure described above, the set of cushion pads (5) is used as a damping mechanism to deliver cushion and noise reduction functions when the dynamic and static iron cores (8, 1) pick up each other. The cushion pads (5) are directly mounted on the dynamic iron core (8), and the damping height (the clearance between the static iron core (1) and the dynamic iron core (8) in closed position) cannot be adjusted and will cause problems in actual installation and operation process. First, because the damping height cannot be adjusted, it is difficult to control; if the damping height is too small, the noise reduction effect will be poor; if the damping height is too great, some electromagnetic force will be wasted and the efficiency will be compromised, and the coil release voltage will be increased. Second, the thickness of the cushion pads (5) is difficult to control during the machining process, and the machining difficulty will be increased; moreover, the cushion pads (5) are usually made of a plastic or rubber material, which has a relatively short service life. When the design service life of the cushion pads (5) is reached, the cushion pads (5) will be thinner due to abrasion, and therefore the noise will be increased; in that case, the cushion pads (5) must be replaced which results in inconvenient maintenance.

A magnetic brake having damping elements with variable elastic coefficient was disclosed in China Patent Authorization Publication No. CN1299022C. In that technical scheme, two sets of damping elements are used as the damping mechanism; the two sets of damping elements are separate from each other, and have to be adjusted separately; therefore, the operation is inconvenient, and the damping heights of the two damping elements are inconsistent after adjustment.

SUMMARY OF THE INVENTION

According to embodiments of the present invention, a disk brake, which is easy to operate and service and has a long service life, includes a damping height of a damping mechanism that is integrally adjustable and consistent after adjustment.

According to an embodiment of the present invention, a disk brake includes: a static iron core; a spring and a coil assembly arranged in the static iron core; a dynamic iron core assembly including a dynamic iron core, a dynamic disk, and first and second friction rotors configured to fit with the dynamic iron core and the dynamic disk and mounted on a main shaft of a traction machine; a plurality of connecting bolts mounting the static iron core and the dynamic iron core assembly to an installation end face of the traction machine; a plurality of spacers arranged having a spacing on the dynamic iron core assembly and configured to fit with the connecting bolts; a damping mechanism arranged on the dynamic iron core assembly, the damping mechanism including a plurality of damping components distributed substantially evenly on the dynamic iron core; an adjusting toothed belt assembly coupled to damping components of the plurality of damping components and banded to a circumferential outer surface of the dynamic iron core; and an adjusting bracket mounted on the circumferential outer surface of the dynamic iron core and coupled to the adjusting toothed belt assembly.

In one embodiment of the present invention, a damping component of the plurality of damping components includes: a damping washer; a damping base; an adjusting gear; and a screw rod, wherein the damping washer is joined to the damping base in a cavity of the damping base, the damping base is coupled to the adjusting gear, and the adjusting gear is coupled to the screw rod.

In one embodiment of the present invention, a plurality of gear base cavities are spaced from each other on the dynamic iron core, the gear base cavities configured to accommodate the damping washers, damping bases, and adjusting gears; a screw rod hole configured to rotatably engage a screw rod of one of the damping components in a rotary manner is formed at the center of each gear base cavity; and a tooth socket is arranged on one side of each gear base cavity facing the circumferential outer surface of the dynamic iron core to expose teeth of the adjusting gear.

In one embodiment of the present invention, the gear base cavities described in the present invention are distributed substantially evenly on an inner circle near the circumference of the dynamic iron core.

In one embodiment of the present invention, the adjusting toothed belt assembly described in the present invention includes: a toothed belt; first and second joints; and an adjusting screw rod, wherein: tooth holes configured to couple with teeth on the adjusting gear are distributed substantially evenly on the toothed belt; the first and second joints are coupled to two ends of the toothed belt; the toothed belt is connected with the adjusting screw rod via the first and second joints on the two ends to form a ring configured to band to the circumferential outer surface of the dynamic iron core and to be tightened by first and second locknuts.

In one embodiment of the present invention, the adjusting screw rod described in the present invention is configured to pass through a hole of the adjusting bracket and to secure to the adjusting bracket by a third locknut.

In one embodiment of the present invention, the toothed belt described in the present invention is made of a metal or plastic material.

In one embodiment of the present invention, the damping base is coupled to the adjusting gear and the adjusting gear is coupled to the screw rod by welding or crimping.

According to another embodiment of the present invention, a disk brake includes: a static iron core; a spring and a coil assembly in the static iron core; a dynamic iron core assembly including a dynamic iron core, a dynamic disk, and first and second friction rotors configured to fit with the dynamic iron core and the dynamic disk; a damping mechanism arranged on the dynamic iron core assembly, the damping mechanism including a plurality of damping components distributed substantially evenly on the dynamic iron core; an adjusting toothed belt assembly coupled to damping components of the plurality of damping components and banded to a circumferential outer surface of the dynamic iron core; and an adjusting bracket mounted on the circumferential outer surface of the dynamic iron core and coupled to the adjusting toothed belt assembly.

Embodiments of the present invention provide the following advantages. Due to the tooth engagement between the tooth hole on the toothed belt and the teeth on the adjusting gear, the damping height of the damping mechanism can be adjusted integrally and synchronously, and the damping height will be consistent after the adjustment. The adjustment is easily made and can take effect immediately. Also, wherein the toothed belt is made of stainless steel or plastic material, it may be punched simply, and therefore easily machined. Additionally, the damping washer is joined in the cavity of the damping base, and therefore can be used safely and reliably. Further, embodiments of the disk brake of the present invention are easy to repair and have a long service life.

Figure 1:
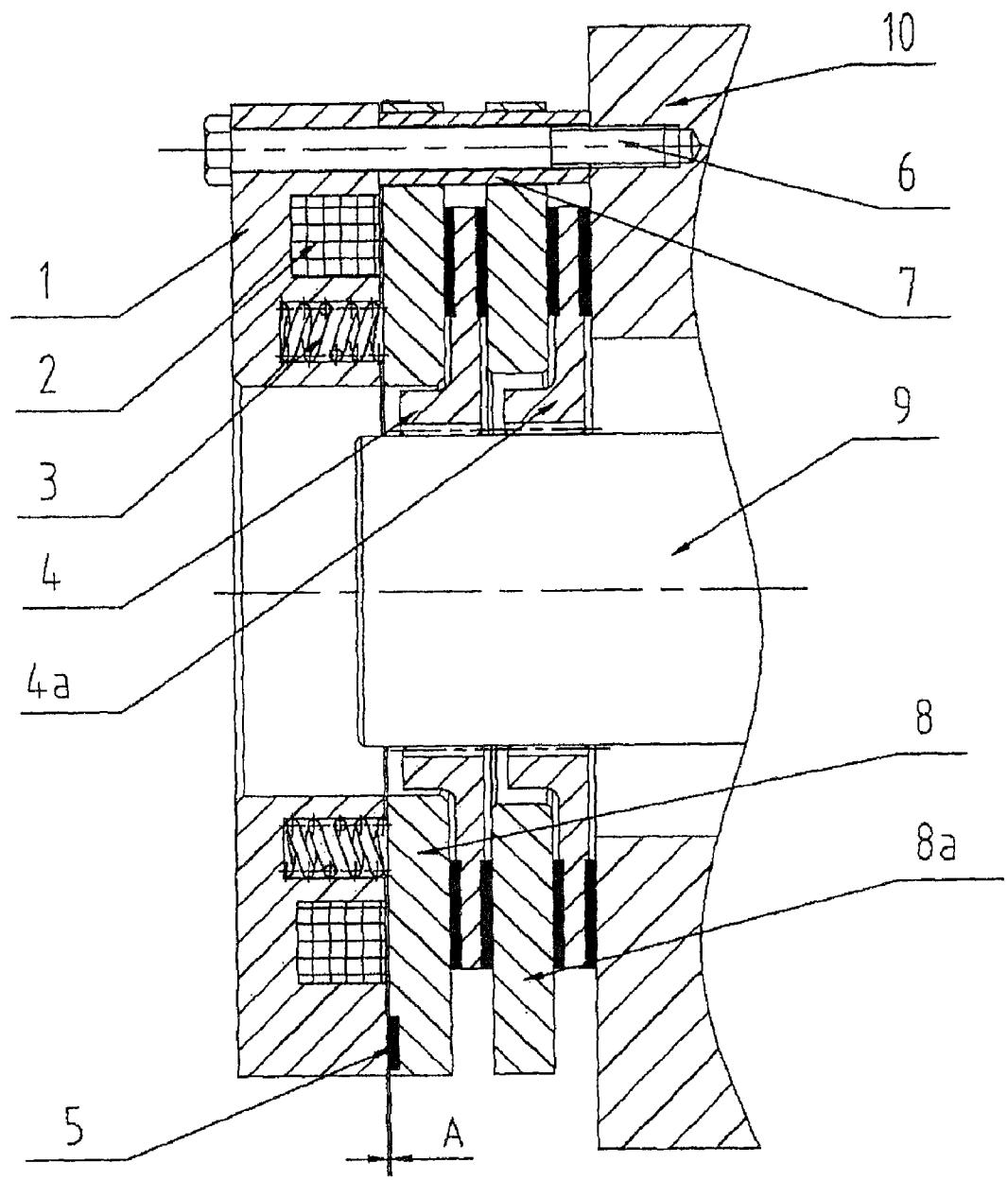
FIG. 1 is a plan schematic diagram of a disk brake structure of the prior art.

In the drawings, reference numeral designations are used to represent the following: 1. static iron core; 2. coil assembly; 3. spring; 4. first friction rotor; 4a. second friction rotor; 5. cushion pad; 6. connecting bolt; 7. spacer; 8. dynamic iron core; 8a. dynamic disk; 9. main shaft of traction machine; 10. installation end face of traction machine; 11. damping washer; 12. damping base; 13. adjusting gear; 14. screw rod; 15. tooth socket; 16. screw rod hole; 17. second hole; 18. gear base cavity; 19. first hole; 20. third locknut; 21. adjusting bracket; 22. adjusting screw rod; 23. second locknut; 24. second joint; 25. first joint; 26. first locknut; 27. outer surface; 28. tooth hole; 29. toothed belt; 30. inner surface; 31. screw.

DETAILED DESCRIPTION OF THE EMBODIMENTS

In order to clearly illustrate and demonstrate the beneficial efficacies of the present invention, certain embodiments of the present invention are described herein; however, those embodiments shall not be deemed as constituting any limitation to the technical scheme or otherwise restricting the spirit and scope of the present invention.

Figure 2:
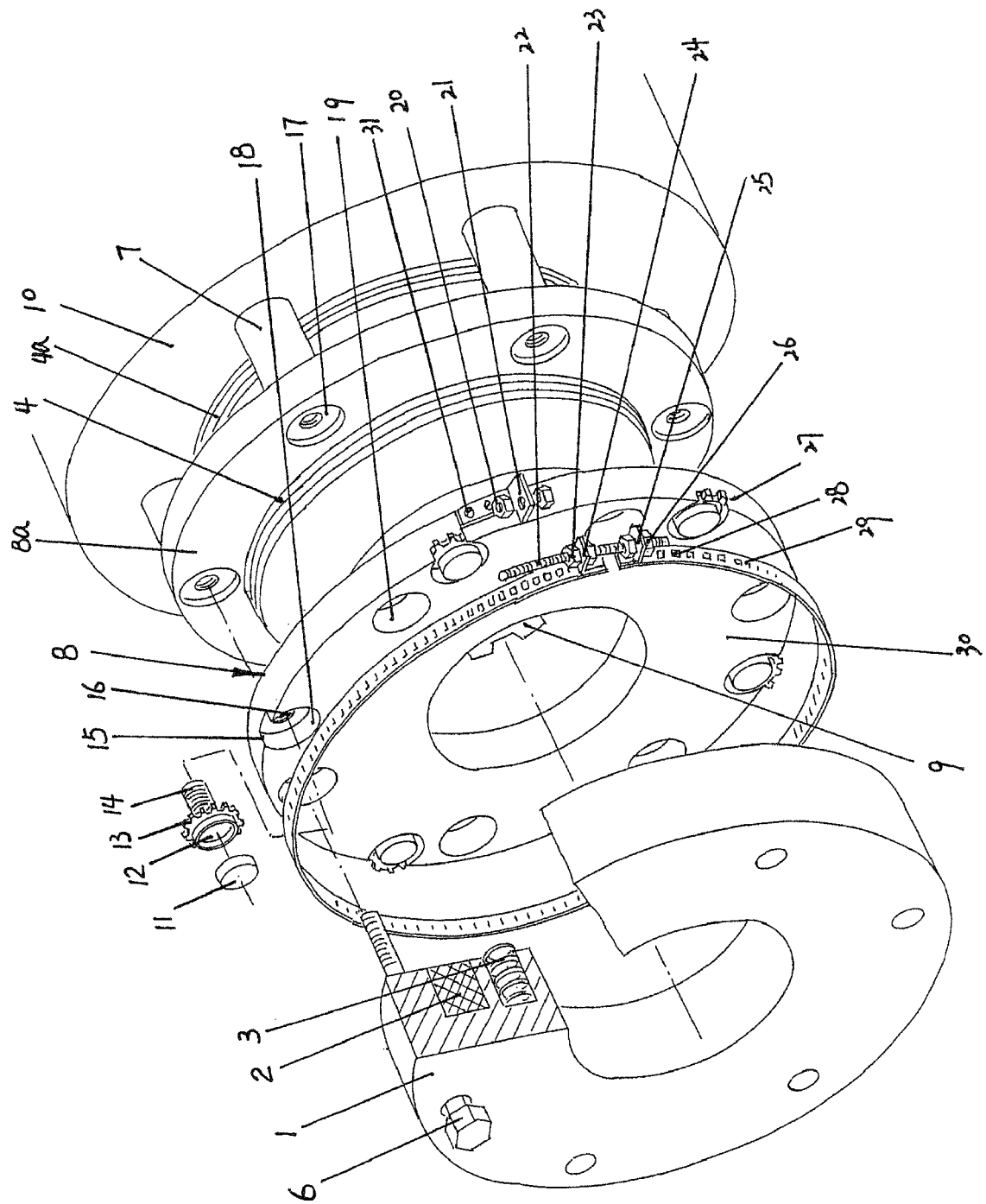
FIG. 2 is an exploded perspective schematic diagram of a disk brake according to an embodiment of the present invention.
Figure 3:
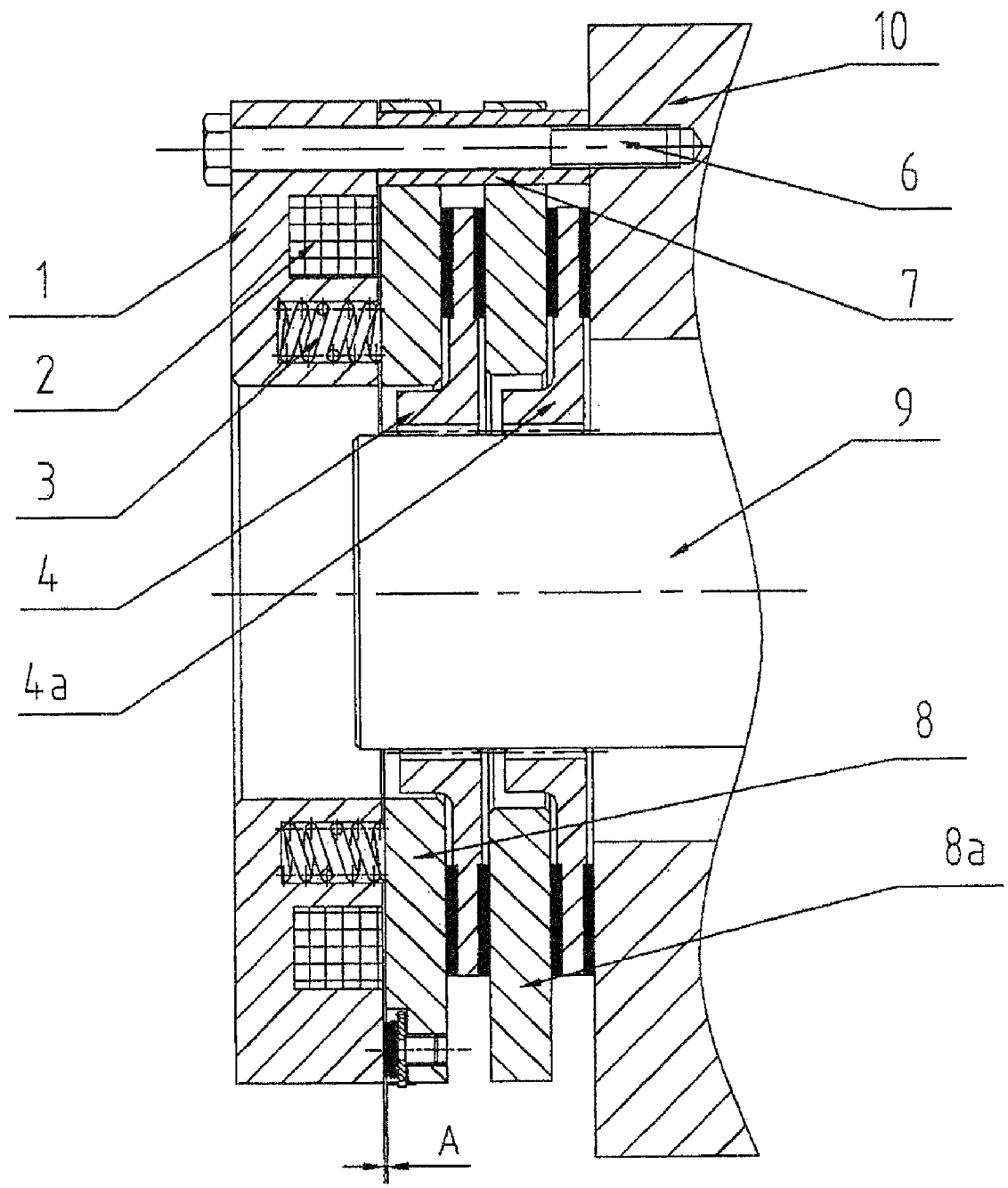
FIG. 3 is a plan schematic diagram of the disk brake of FIG. 2.
Figure 4:
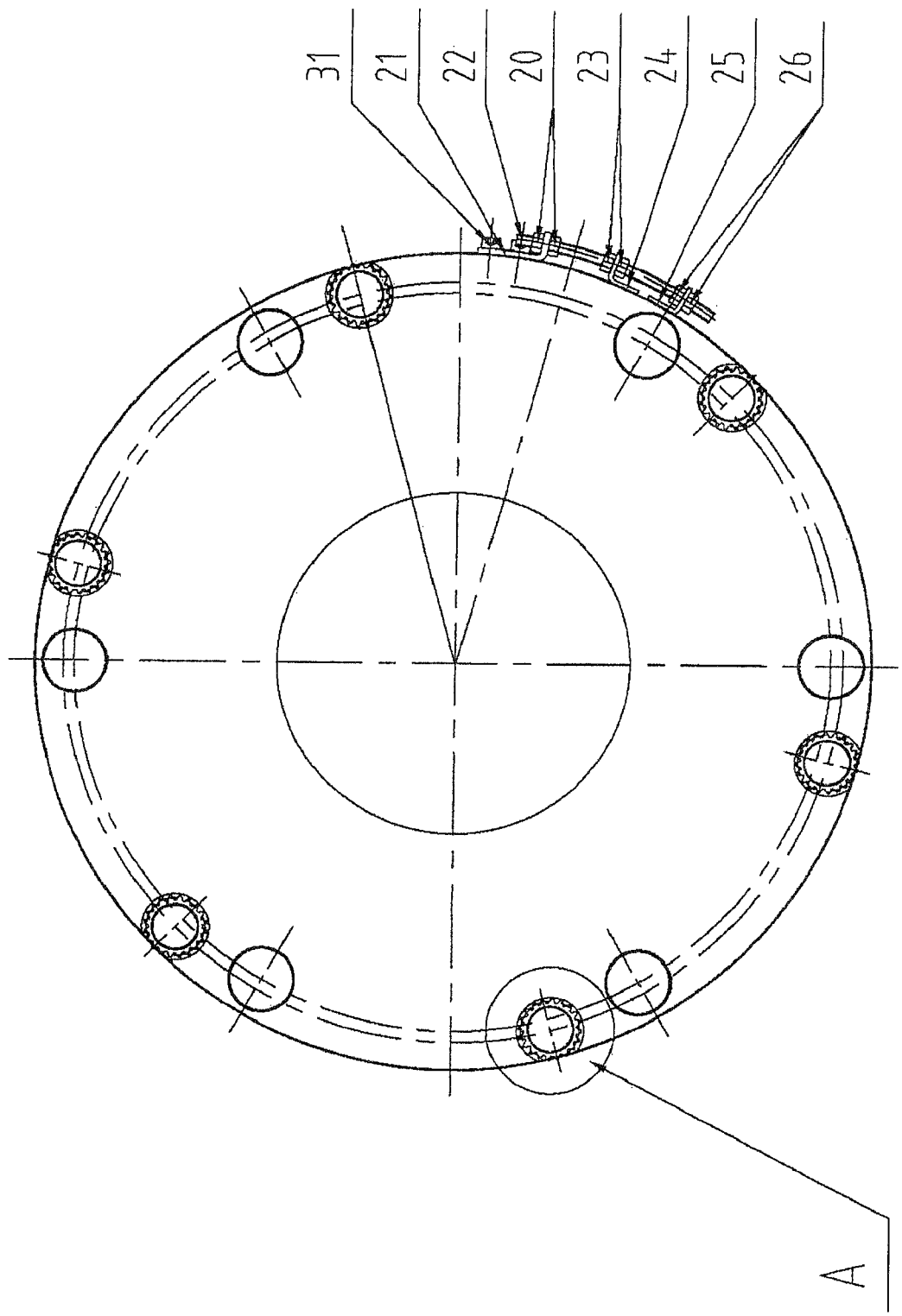
FIG. 4 is a front view schematic diagram of a dynamic iron core assembly and a damping mechanism of the disk brake of FIG. 2.
Figure 5:
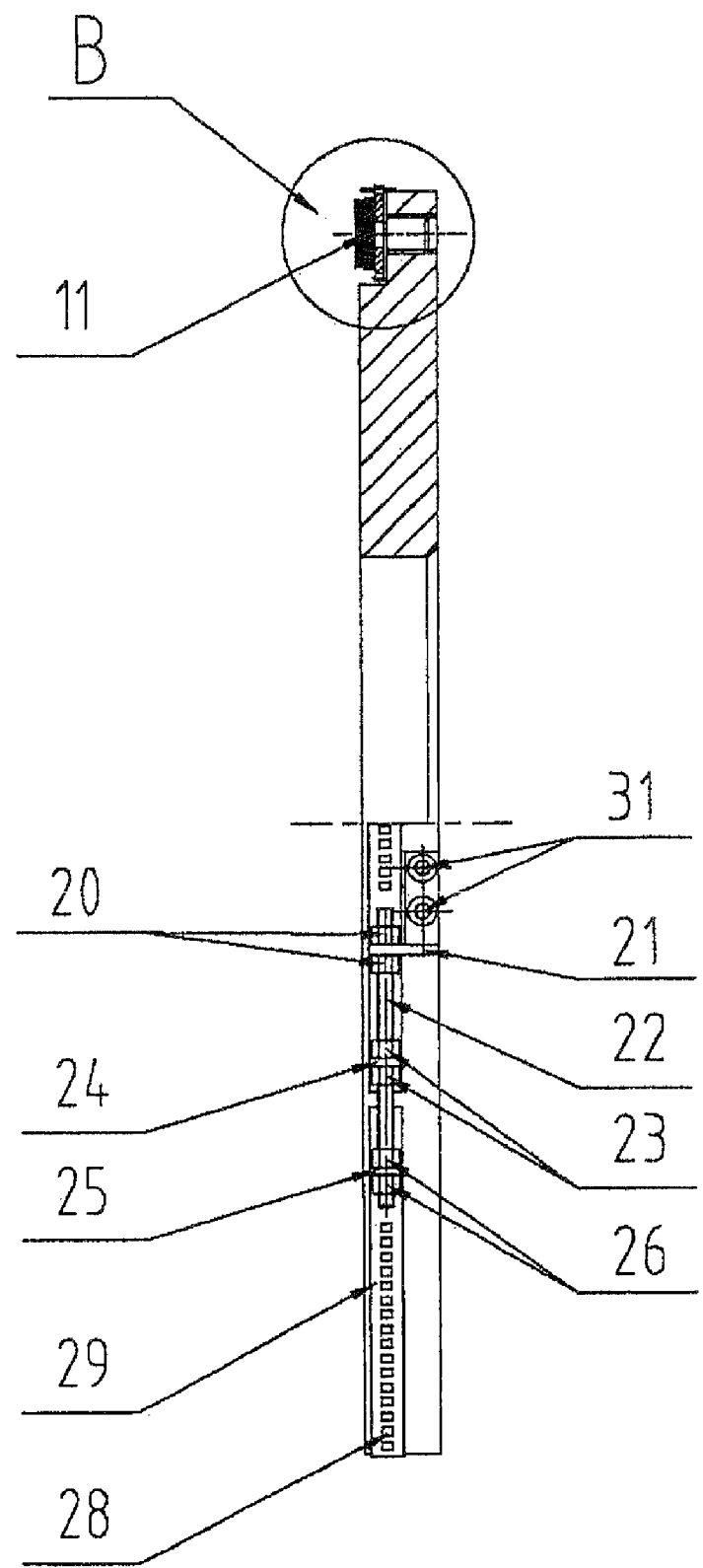
FIG. 5 is a side view schematic diagram of the structure of FIG. 4.
Figure 6:
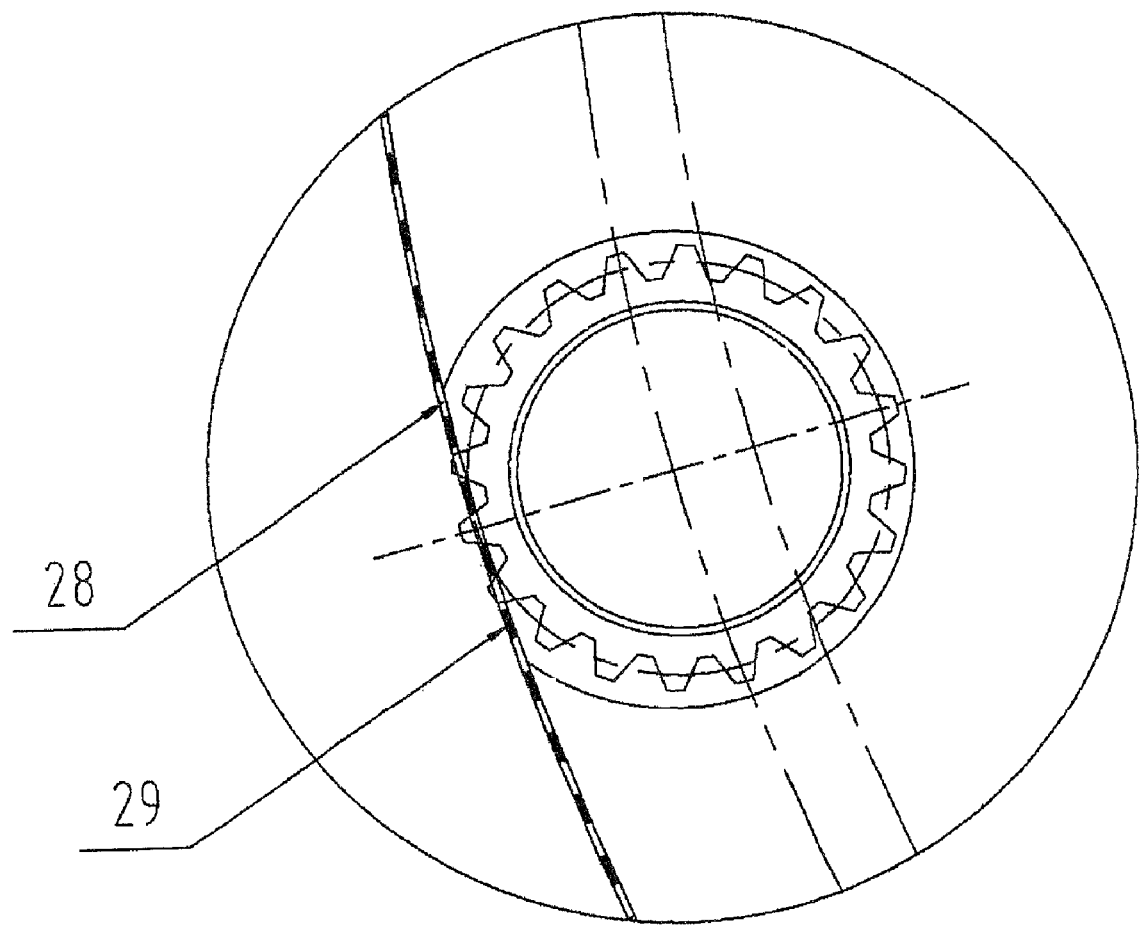
FIG. 6 is a detail schematic diagram of region "A" in FIG. 4.
Figure 7:
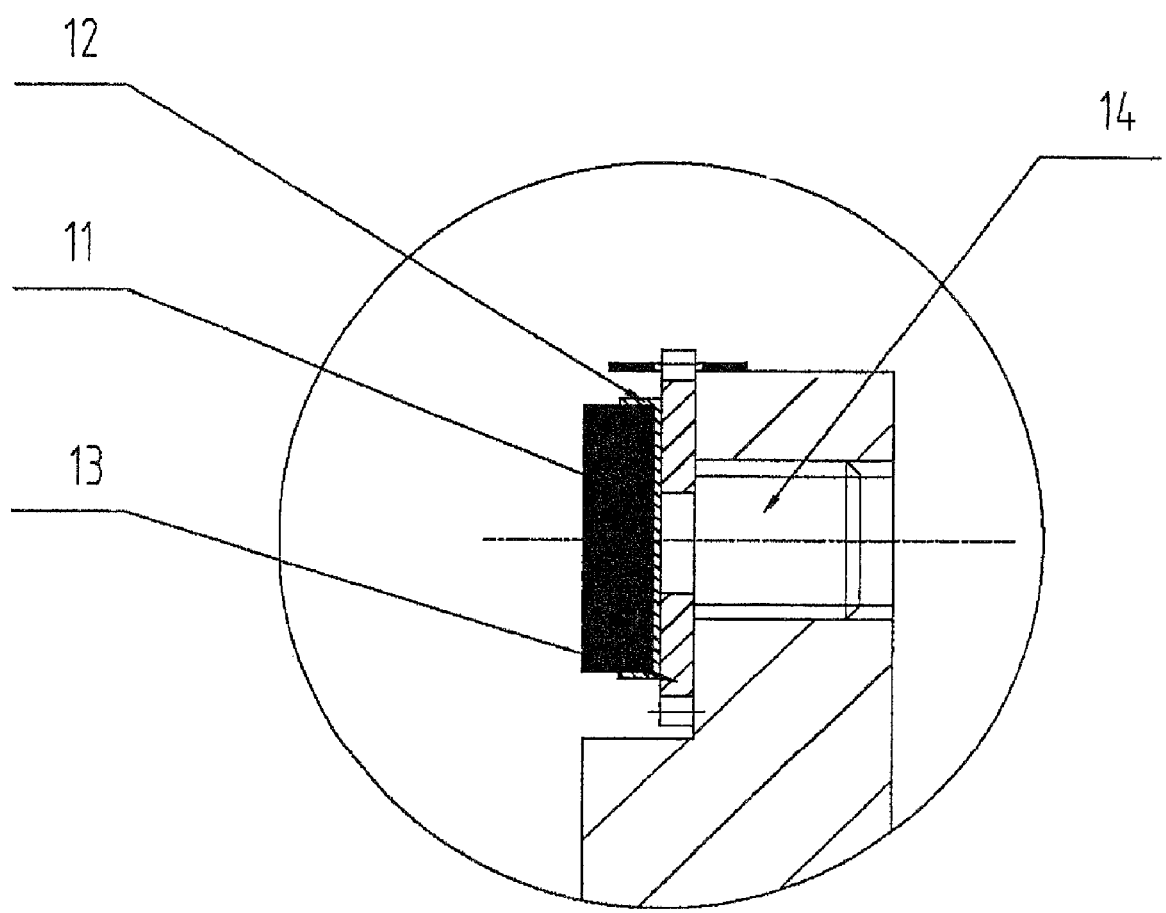
FIG. 7 is a detail schematic diagram of region "B" in FIG. 5.

With reference to FIGS. 2-7, a disk brake according to an embodiment of the present invention includes: a static iron core (1); a spring (3) and a coil assembly (2) arranged in the static iron core (1); a dynamic iron core assembly composed of a dynamic iron core (8) and a dynamic disk (8a), first and second friction rotors (4, 4a) designed to fit with the dynamic iron core (8) and the dynamic disk (8a) and connected to a main shaft (9) of a traction machine via a spline; a set of connecting bolts (6); a set of spacers (7); and a damping mechanism arranged on the dynamic iron core assembly. First and second holes (19, 17) are evenly distributed on the inner surface (30) near the circumference of the dynamic iron core (8) and the dynamic disk (8a), respectively; the first and second holes (19, 17) are at positions matching each other. Spacers 7 are mounted in the first and second holes (19, 17). Connecting bolts (6) pass through the static iron core (1) and corresponding spacers (7) in the first and second holes (19, 17) and threadedly connect to an installation end face (10) of the traction machine. The damping mechanism includes a set of damping components distributed on the dynamic iron core (8) at certain spacing, an adjusting toothed belt assembly fitted to the damping components and banded at the circumference of the dynamic iron core (8) at outer surface (27), and an adjusting bracket (21) mounted at the circumference of the dynamic iron core (8) at outer surface (27) and configured to fix and adjust the toothed belt assembly. The damping component includes a damping washer (11), a damping base (12), an adjusting gear (13), and a screw rod (14). The damping washer (11) is joined to the damping base (12) in a cavity of the damping base (12) in a tight fitting manner. The damping base (12) is connected to the adjusting gear (13), and the adjusting gear (13) is connected to the screw rod (14), such as by welding or crimping. A set of gear base cavities (18) are evenly distributed on the inner surface (30) near the circumference of the dynamic iron core (8), and the positions of the gear base cavities (18) do not overlap the positions of the first holes (19). A screw rod hole (16) is formed at the center of each gear base cavity (18). A tooth socket (15) is arranged on one side of each gear base cavity (18) facing the circumference of the dynamic iron core (8) at outer surface (27); wherein, the damping washer (11), damping base (12), and adjusting gear (13) of the damping component are arranged in the gear base cavity (18), and expose some teeth of the adjusting gear (13) on the circumference of the dynamic iron core (8) at outer surface (27) via the tooth socket (15). The screw rod (14) of the damping component is engaged with the screw rod hole (16) in a rotary manner and can be screwed into or out of the screw rod hole (16) so as to adjust the damping height of the damping mechanism automatically. The adjusting toothed belt assembly includes a toothed belt (29), a pair of first and second joints (25, 24), and an adjusting screw rod (22), wherein the toothed belt (29) may be made of metal or plastic material into a strip form, and tooth holes (28) are formed on the toothed belt (29) by punching. The first and second joints (25, 24) are fixed to two ends of the toothed belt (29), such as by welding. During the installation process, the first and second joints (25, 24) on the ends of the toothed belt (29) are connected by the adjusting screw rod (22), and the toothed belt (29) forms a ring banding to the circumference of the dynamic iron core (8) at the outer surface (27). The tooth holes (28) on the toothed belt (29) engage the teeth exposed on the tooth socket (15) on the adjusting gear (13). In addition, the first joint (25) is connected to the adjusting screw rod (22) and the second joint (24) is connected to the adjusting screw rod (22) with first and second locknuts (26, 23), so that the toothed belt (29) bands to the circumference of the dynamic iron core (8) at the outer surface (27). The adjusting bracket (21) is fixed to the circumference of the dynamic iron core (8) at the outer surface (27) with screws (31), and the adjusting screw rod (22) passes through a hole on the adjusting bracket (21) and then is secured to the adjusting bracket (21) via the third locknut (20).

In the present invention, if the damping height of the damping mechanism is inappropriate, the third locknut (20) can be loosened, and the adjusting screw rod (22) can be adjusted slightly, i.e., by turning the adjusting toothed belt assembly in a clockwise or counter-clockwise direction, so that the toothed belt (29) for adjusting the toothed belt assembly drives the engaged adjusting gear (13) to move slightly. Driven by the adjusting gear (13), the screw rod (14) rotates in the screw rod hole (16), so that the damping heights of all damping washers (11) in the gear base cavities (18) of the dynamic iron core (8) are adjusted slightly at the same tine, to provide adjusting of the damping height of the damping mechanism synchronously. Accordingly, the operation may be easily performed, and can ensure consistent damping height after the adjustment.

The working principle and braking procedures of the disk brake of the present invention are as described above with respect to the prior art, and therefore will not be described further here.

The invention claimed is:

1. A disk brake comprising: a static iron core (1); a spring (3) and a coil assembly (2) arranged in the static iron core (1); a dynamic iron core assembly comprising a dynamic iron core (8), a dynamic disk (8a), and first and second friction rotors (4, 4a) configured to fit with the dynamic iron core (8) and the dynamic disk (8a) and mounted on a main shaft (9) of a traction machine; a plurality of connecting bolts (6) mounting the static iron core (1) and the dynamic iron core assembly to an installation end face (10) of the traction machine; a plurality of spacers (7) arranged having a spacing on the dynamic iron core assembly and configured to fit with the connecting bolts (6); a damping mechanism arranged on the dynamic iron core assembly, the damping mechanism comprising a plurality of damping components distributed substantially evenly on the dynamic iron core (8); an adjusting toothed belt assembly coupled to damping components of the plurality of damping components and banded to a circumferential outer surface of the dynamic iron core (8); and an adjusting bracket (21) mounted on the circumferential outer surface of the dynamic iron core (8) and coupled to the adjusting toothed belt assembly.

2. The disk brake according to claim 1, wherein a damping component of the plurality of damping components comprises a damping washer (11); a damping base (12); an adjusting gear (13); and a screw rod (14), wherein the damping washer (11) is joined to the damping base (12) in a cavity of the damping base (12), the damping base (12) is coupled to the adjusting gear (13), and the adjusting gear (13) is coupled to the screw rod (14).

3. The disk brake according to claim 2, wherein a plurality of gear base cavities (18) are spaced from each other on the dynamic iron core (8), the gear base cavities (18) configured to accommodate the damping washer (11), damping base (12), and adjusting gear (13); a screw rod hole (16) configured to rotatably engage a screw rod (14) in a rotary manner is formed at the center of each gear base cavity (18); and a tooth socket (15) is arranged on one side of each gear base cavity (18) facing the circumferential outer surface of the dynamic iron core (8) to expose teeth of the adjusting gear (13).

4. The disk brake according to claim 3, wherein the gear base cavities (18) are substantially evenly distributed on an inner surface near the circumference of the dynamic iron core (8).

5. The disk brake according to claim 2, wherein the adjusting toothed belt assembly comprises: a toothed belt (29); first and second joints (25, 24); and an adjusting screw rod (22), wherein tooth holes (28) configured to couple with teeth of the adjusting gear (13) are distributed substantially evenly on the toothed belt (29); the first and second joints (25, 24) are coupled to two ends of the toothed belt (29); and the toothed belt (29) is connected with the adjusting screw rod (22) via the first and second joints (25, 24) on the two ends to form a ring configured to band to the circumferential outer surface of the dynamic iron core (8) and to be tightened by first and second locknuts (26, 23).

6. The disk brake according to claim 5, wherein the adjusting screw rod (22) is configured to pass through a hole of the adjusting bracket (21) and to secure to the adjusting bracket (21) by a third locknut (20).

7. The disk brake according to claim 5, wherein the toothed belt (29) is made of metal or plastic material.

8. The disk brake according to claim 2, wherein the damping base (12) is coupled to the adjusting gear (13) and the adjusting gear (13) is coupled to the screw rod (14) by welding or crimping.

9. The disk brake according to claim 1, wherein an adjusting screw rod (22) is configured to pass through a hole of an adjusting bracket (21) and to secure to the adjusting bracket (21) by a third locknut (20).

10. A disk brake comprising: a static iron core (1); a spring (3) and a coil assembly (2) in the static iron core (1); a dynamic iron core assembly comprising a dynamic iron core (8), a dynamic disk (8a), and first and second friction rotors (4, 4a) configured to fit with the dynamic iron core (8) and the dynamic disk (8a); a damping mechanism arranged on the dynamic iron core assembly, the damping mechanism comprising a plurality of damping components distributed substantially evenly on the dynamic iron core (8); an adjusting toothed belt assembly coupled to damping components of the plurality of damping components and banded to a circumferential outer surface of the dynamic iron core (8); and an adjusting bracket (21) mounted on the circumferential outer surface of the dynamic iron core (8) and coupled to the adjusting toothed belt assembly.

11. The disk brake according to claim 10, wherein a damping component of the plurality of damping components comprises a damping washer (11); a damping base (12); an adjusting gear (13); and a screw rod (14), wherein the damping washer (11) is joined to the damping base (12) in a cavity of the damping base (12), the damping base (12) is coupled to the adjusting gear (13), and the adjusting gear (13) is coupled to the screw rod (14).

12. The disk brake according to claim 11, wherein a plurality of gear base cavities (18) are spaced from each other on the dynamic iron core (8), the gear base cavities (18) configured to accommodate the damping washer (11), damping base (12), and adjusting gear (13); a screw rod hole (16) configured to rotatably engage a screw rod (14) in a rotary manner is formed at the center of each gear base cavity (18); and a tooth socket (15) is arranged on one side of each gear base cavity (18) facing the circumferential outer surface of the dynamic iron core (8) to expose teeth of the adjusting gear (13).

13. The disk brake according to claim 12, wherein the gear base cavities (18) are substantially evenly distributed on an inner surface near the circumference of the dynamic iron core (8).

14. The disk brake according to claim 11, wherein the adjusting toothed belt assembly comprises: a toothed belt (29); first and second joints (25, 24); and an adjusting screw rod (22), wherein tooth holes (28) configured to couple with teeth of the adjusting gear (13) are distributed substantially evenly on the toothed belt (29); the first and second joints (25, 24) are coupled to two ends of the toothed belt (29); and the toothed belt (29) is connected with the adjusting screw rod (22) via the first and second joints (25, 24) on the two ends to form a ring configured to band to the circumferential outer surface of the dynamic iron core (8) and to be tightened by first and second locknuts (26, 23).

15. The disk brake according to claim 14, wherein the adjusting screw rod (22) is configured to pass through a hole of the adjusting bracket (21) and to secure to the adjusting bracket (21) by a third locknut (20).

16. The disk brake according to claim 14, wherein the toothed belt (29) is made of metal or plastic material.

17. The disk brake according to claim 11, wherein the damping base (12) is coupled to the adjusting gear (13) and the adjusting gear (13) is coupled to the screw rod (14) by welding or crimping.

18. The disk brake according to claim 10, wherein an adjusting screw rod (22) is configured to pass through a hole of an adjusting bracket (21) and to secure to the adjusting bracket (21) by a third locknut (20).

\* \* \* \* \*